3,133,106
PHENYLHYDRAZINE HEXAFLUOROARSENATE
Hugh T. Harrison, Midland, Mich., assignor to The Dow Chemical Company, Midland, Mich., a corporation of Delaware
No Drawing. Filed June 4, 1962, Ser. No. 199,623
1 Claim. (Cl. 260—440)

The present invention is directed to salts of hexafluoroarsenic or hexafluorophosphoric acid with phenylhydrazine. These salts correspond to one of the formulae

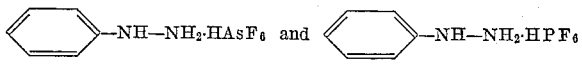

The present compounds are crystalline materials, of low solubility in organic solvents and of moderate solubility in water. They are useful as parasiticides and are adapted to be employed as parasiticides in the control of insect, bacterial and fungal pests such as *Aspergillus terreus*, *Staphylococcus aureus* and *Pullularia pullulans*.

The novel compounds can be prepared by reacting together hexafluoroarsenic or hexafluorophosphoric acid and phenylhydrazine. Conveniently, the reaction is carried out in an inert liquid reaction medium, such as water. Good results are obtained when substantially equimolecular proportions of the reactants are employed. The reaction is exothermic and takes place smoothly at temperatures of from 15° to 50° C.

In carrying out the reaction, the phenylhydrazine is contacted with the hexafluoroarsenic or hexafluorophosphoric acid in any conventional manner. The contacting is conveniently carried out by adding one reactant to the other reactant. Oftentimes it is convenient to employ the hydrate form of the acid reactant. The temperature of the resulting reaction medium can be controlled by regulating the rate of the contacting of the reactants as well as by external cooling. Sometimes the desired product precipitates in the mixture during the reaction. Where desirable to maintain fluid condition such product can in part be separated by conventional procedures. Upon completion of the contacting of the reactants, most of the reaction will have taken place with the production of the desired product. Where optimum yields are desired, it is often convenient that the reaction mixture be allowed to stand several hours to insure substantial completion of reaction. Upon completion of the reaction, the solvent can be removed from the reaction mixture by evaporation or distillation under reduced pressure to obtain the salt product as a residue. This product can be further purified by conventional procedures such as washing with water or suitable organic liquid and recrystallization.

Twenty milliliters (0.20) mole of phenylhydrazine are added to an aqueous 65 percent solution of hexafluorophosphoric acid (equivalent to 32.5 grams; 0.17 mole of $HPF_6$). The aqueous $HPF_6$ solution employed is a commercial product containing 65 percent $HPF_6$, 21 percent $H_2O$, and 14 percent of related phosphorus acids.

The addition is carried out over a period of thirty minutes and at room temperature. Upon completion of the addition, the reaction mixture is cooled to a temperature near to 0° C. The reaction mixture is then filtered to obtain the phenylhydrazine hexafluorophosphate product as a crystalline residue. This product is recrystallized from absolute ethanol and found to melt at from 138°–140° C.

Similarly, phenylhydrazine hexafluoroarsenate is prepared from phenylhydrazine and hexafluoroarsenic acid monohydrate and is found to be a white crystalline material melting at from 113°–114° C.

The present compounds are useful as parasiticides in various insecticidal, nematocidal and antimicrobial compositions. For such use, the unmodified compounds can be employed. However, the present invention also encompasses the use of the compounds together with a parasiticide adjuvant. In such use, the compounds can be dispersed upon a finely divided solid and the resulting preparations employed as dusts. Also, such mixtures can be dispersed in water with the aid of a wetting agent and the resulting aqueous suspensions employed as sprays. In other procedures, the products can be employed as a constitutent of organic liquid compositions, oil-in-water or water-in-oil emulsions, or water dispersions with or without the addition of wetting, dispersing or emulsifying agents.

In representative operations phenylhydrazine hexafluorophosphate gives substantially complete controls of *Staphylococcus aureus*, *Aspergillus terreus* and *Pullularia pullulans* organisms at concentrations of 500 parts per million by weight.

I claim:
Phenylhydrazine hexafluoroarsenate.

References Cited in the file of this patent

UNITED STATES PATENTS

| | | |
|---|---|---|
| 1,960,712 | Reimers | May 29, 1934 |
| 2,885,399 | Omietanski | May 5, 1959 |

OTHER REFERENCES

Fluorine Chemistry, edited by J. H. Simon, Academic Press Inc., New York (1950), pages 138–139.